United States Patent
Maeda et al.

(10) Patent No.: US 11,142,104 B2
(45) Date of Patent: Oct. 12, 2021

(54) RECLINING DEVICE

(71) Applicant: SHIROKI CORPORATION, Fujisawa (JP)

(72) Inventors: Noriaki Maeda, Fujisawa (JP); Hidehiko Fujioka, Fujisawa (JP)

(73) Assignee: SHIROKI CORPORATION, Fujisawa (JP)

( * ) Notice: Subject to any disclaimer, the term of this patent is extended or adjusted under 35 U.S.C. 154(b) by 0 days.

(21) Appl. No.: 16/963,525

(22) PCT Filed: Feb. 21, 2019

(86) PCT No.: PCT/JP2019/006550
§ 371 (c)(1),
(2) Date: Jul. 21, 2020

(87) PCT Pub. No.: WO2019/167790
PCT Pub. Date: Sep. 6, 2019

(65) Prior Publication Data
US 2021/0068545 A1    Mar. 11, 2021

(30) Foreign Application Priority Data
Feb. 27, 2018    (JP) .............................. JP2018-032878

(51) Int. Cl.
*B60N 2/22*    (2006.01)
*G05G 5/12*    (2006.01)
(Continued)

(52) U.S. Cl.
CPC ............. *B60N 2/2356* (2013.01); *G05G 5/18* (2013.01); *A47C 1/027* (2013.01); *B60N 2/20* (2013.01)

(58) Field of Classification Search
CPC ........ B60N 2/20; B60N 2/235; B60N 2/2356; B60N 2/2362; G05G 5/18; G05G 5/24; A47C 1/02; A47C 1/027; F16H 31/004
See application file for complete search history.

(56) References Cited

U.S. PATENT DOCUMENTS 6,312,053 B1 *  11/2001  Magyar .................... B60N 2/20
                                                              297/367 R
8,955,911 B2 *   2/2015  Yamada ............... B60N 2/2356
                                                              297/367 P
(Continued)

FOREIGN PATENT DOCUMENTS

JP    2012176209 A    9/2012
JP    2013000229 A    1/2013
(Continued)

OTHER PUBLICATIONS

International Search Report (PCT/ISA/210) and translation and Written Opinion (PCT/ISA/237) dated May 14, 2019, by the Japanese Patent Office as the International Searching Authority for International Application No. PCT/JP2019/006550.

*Primary Examiner* — Adam D Rogers
(74) *Attorney, Agent, or Firm* — Buchanan Ingersoll & Rooney PC (57) ABSTRACT

An object of the present invention is to provide a reclining apparatus in which when a pawl is in an unlocked position, orientation of the pawl is stable, and when the pawl moves to a locked position, meshing between outer teeth of the pawl and inner teeth of a first member is stable. The reclining apparatus has at least one second cam that is provided between a cam and a second pawl, and is pressed by the cam to press the second pawl. The reclining apparatus is provided with a spring or pressing the second pawl against a pawl guide protrusion.

5 Claims, 12 Drawing Sheets

(51) Int. Cl.
*B60N 2/235* (2006.01)
*G05G 5/18* (2006.01)
*A47C 1/027* (2006.01)
*B60N 2/20* (2006.01)

(56) References Cited

U.S. PATENT DOCUMENTS

| | | | |
|---|---|---|---|
| 8,998,330 B2* | 4/2015 | Ito | B60N 2/2356 297/367 L |
| 9,108,545 B2* | 8/2015 | Maeda | B60N 2/236 |
| 9,290,113 B2* | 3/2016 | Mikasa | B60N 2/236 |
| 9,452,696 B2* | 9/2016 | Higashi | B60N 2/2356 |
| 10,029,588 B2* | 7/2018 | Maeda | B60N 2/2245 |
| 10,793,030 B2* | 10/2020 | Maeda | B60N 2/236 |
| 2013/0264850 A1 | 10/2013 | Maeda | |
| 2014/0103693 A1 | 4/2014 | Yamada et al. | |

FOREIGN PATENT DOCUMENTS

| | | | |
|---|---|---|---|
| JP | 2013216203 A | | 10/2013 |
| JP | 2014239721 A | | 12/2014 |
| JP | 2017217562 A | | 12/2017 |
| JP | 2019180882 A | * | 10/2019 |

* cited by examiner

RECLINING DEVICE

TECHNICAL FIELD

The present invention relates to a reclining apparatus which includes: a first member having inner teeth formed in a circumferential direction on its inner cylindrical surface, and an open surface, and having a bottomed cylindrical shape; a plurality of pawls having outer teeth meshable with the inner teeth; a second member that is laminated on the open surface of the first member and is provided rotatable relative to the first member in the circumferential direction, and further has a plurality of pawl guides configured to guide the pawls between a locked position in which the outer teeth mesh with the inner teeth and an unlocked position in which the outer teeth are separated from the inner teeth; a cam that is rotatably provided between the first member and the second member and causes the pawls to move toward the locked position; and one or more second cams that are provided between the cam and the pawl, and are pressed by the cam to press the pawl. The pawl is guided between two of the pawl guides, when the pawl is in the locked position, relative rotation between the first member and the second member is prohibited, and the second cam presses the pawl toward the locked position and causes the pawl to closely contact one pawl guide, and a spring is provided to press the pawl toward the one pawl guide.

BACKGROUND ART

As one example of reclining apparatuses, there is a reclining apparatus which includes: a first member having inner teeth formed in a circumferential direction on its inner cylindrical surface, and an open surface, and having a bottomed cylindrical shape; a plurality of pawls having outer teeth meshable with the inner teeth; a second member that is laminated on the open surface of the first member and is provided rotatable relative to the first member in the circumferential direction, and further has a plurality of pawl guides configured to guide the pawls between a locked position in which the outer teeth mesh with the inner teeth and an unlocked position in which the outer teeth are separated from the inner teeth; a cam that is rotatably provided between the first member and the second member and causes the pawls to move toward the locked position; and one or more second cams that are provided between the cam and the pawl, and are pressed by the cam to press the pawl. The pawl is guided between two of the pawl guides, when the pawl is in the locked position, relative rotation between the first member and the second member is prohibited, and the second cam presses the pawl toward the locked position and causes the pawl to closely contact one pawl guide, and a spring is provided to press the pawl toward the one pawl guide (for example, PATENT LITERATURE 1).

CITATION LIST

Patent Literature

PATENT LITERATURE 1: JP-A-2014-239721

SUMMARY OF THE INVENTION

Problems to be Solved by Invention

However, in a structure described in PATENT LITERATURE 1, when the outer teeth of the pawl are not meshed with the inner teeth of the first member, that is, when the pawl is in the unlocked position, the pawl is supported only by the pawl guide. There is a gap between the pawl and the pawl guide for smooth movement of the pawl, accuracy of parts of the pawl or the pawl guide, and the like.

Therefore, orientation of the pawl is not stable when the pawl is in the unlocked position. Specifically, a surface facing the guide of the pawl pressed by the second cam is short. Therefore, the pawl is not particularly stable. Then, when the pawl is moved to the locked position by the cam or the second cam, there arises a problem that meshing between the outer teeth of the pawl and the inner teeth of the first member is not stable.

The present invention has been made in view of the above problems. An object of the present invention is to provide a reclining apparatus having stable meshing between the outer teeth of the pawl and the inner teeth of the first member.

Solution to Problems

In order to address at least one of the problems described above, a reclining apparatus according to an aspect of the present invention includes: a first member having inner teeth formed in a circumferential direction on its inner cylindrical surface, and an open surface, and having a bottomed cylindrical shape; a plurality of pawls having outer teeth meshable with the inner teeth; a second member that is laminated on the open surface of the first member and is provided rotatable relative to the first member in the circumferential direction, and further has a plurality of pawl guides configured to guide the pawls between a locked position in which the outer teeth mesh with the inner teeth and an unlocked position in which the outer teeth are separated from the inner teeth; a cam that is rotatably provided between the first member and the second member and causes the pawls to move toward the locked position; and one or more second cams that are provided between the cam and the pawl, and are pressed by the cam to press the pawl. The pawl is guided between two of the pawl guides, when the pawl is in the locked position, relative rotation between the first member and the second member is prohibited, and the second cam presses the pawl toward the locked position and causes the pawl to closely contact one pawl guide, and a spring is provided to press the pawl toward the one pawl guide.

Other features of the present invention will be more apparent from the modes for carrying out the invention described below and the accompanying drawings.

Effects of Invention

According to the reclining apparatus of the present invention, by providing the spring that presses the pawl toward the one pawl guide, the orientation of the pawl is stabilized in a state where the pawl is in the unlocked position. Then, when the pawl moves to the locked position, the meshing between the outer teeth of the pawl and the inner teeth of the first member is stable.

Other features of the present invention will be more apparent from the modes for carrying out the invention described below and the accompanying drawings.

BRIEF DESCRIPTION OF DRAWINGS

FIG. 8 is an end view of a cutting portion taken along a cutting line VIII-VIII in

FIG. 7.

DESCRIPTION OF EMBODIMENTS

Embodiments will be described with reference to the drawings.

Figure 12:
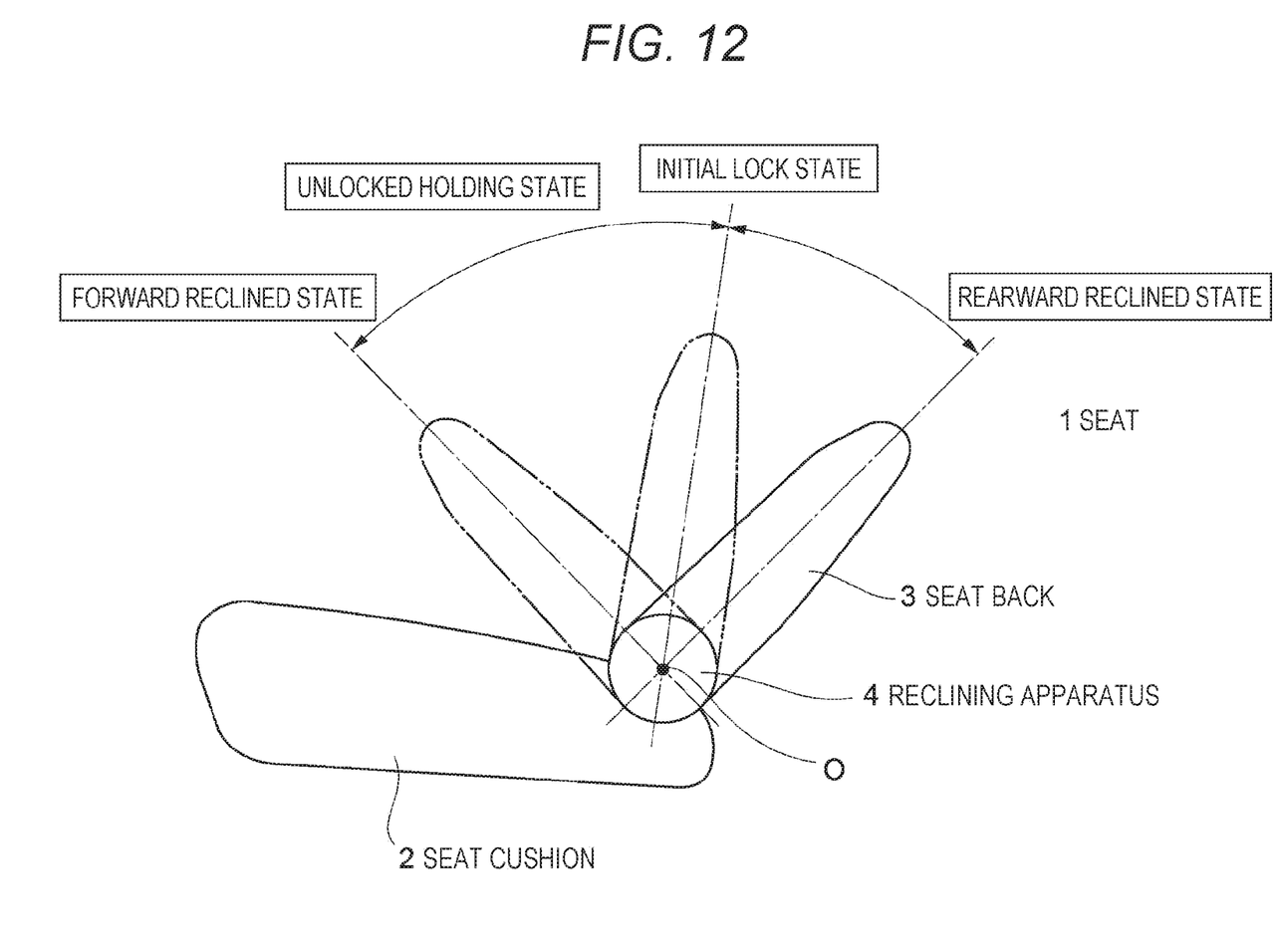
FIG. 12 is a configuration diagram of a seat provided with the reclining apparatus of the present embodiment.

First, a seat provided with a reclining apparatus of the present embodiment will be described with reference to FIG. 12. A seat 1 includes a seat cushion 2 that supports buttocks of a seated person, and a seat back 3 that is provided reclinable in a front-rear direction with respect to the seat cushion 2 and supports a back of the seated person. A reclining apparatus 4 is provided on a rotation axis (O) of reclining of the seat back 3, and permits and prohibits the reclining of the seat back 3.

The reclining apparatus 4 can be reclined in a range from a forward reclined state to a rearward reclined state. The reclining apparatus 4 can permit and prohibit the reclining of the seat back 3 in a range from an initial stage locked state to the rearward reclined state, and in the forward reclined state. On the other hand, in a range from the initial stage locked state to the forward reclined state, the reclining apparatus 4 is in a state where unlocking is held by an unlocking holding mechanism. Therefore, the seat cushion can be reclined without operating an operation lever.

The reclining apparatus of the present embodiment is provided on the left and right of the seat. They have the same structure. Therefore, the reclining apparatus 4 on one side will be described below.

Figure 1:
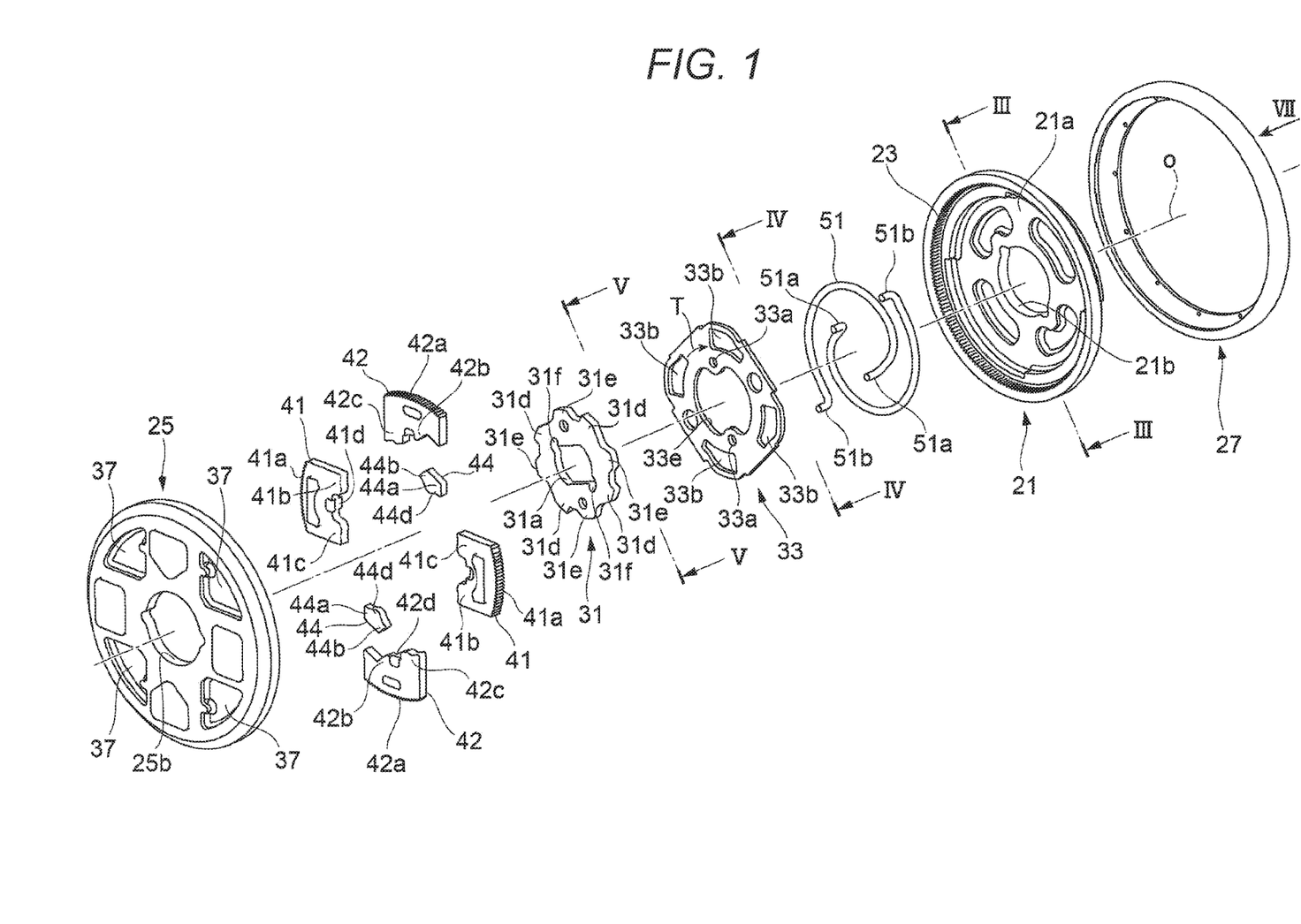
FIG. 1 is an exploded perspective view of a reclining apparatus of the present embodiment.
Figure 2:
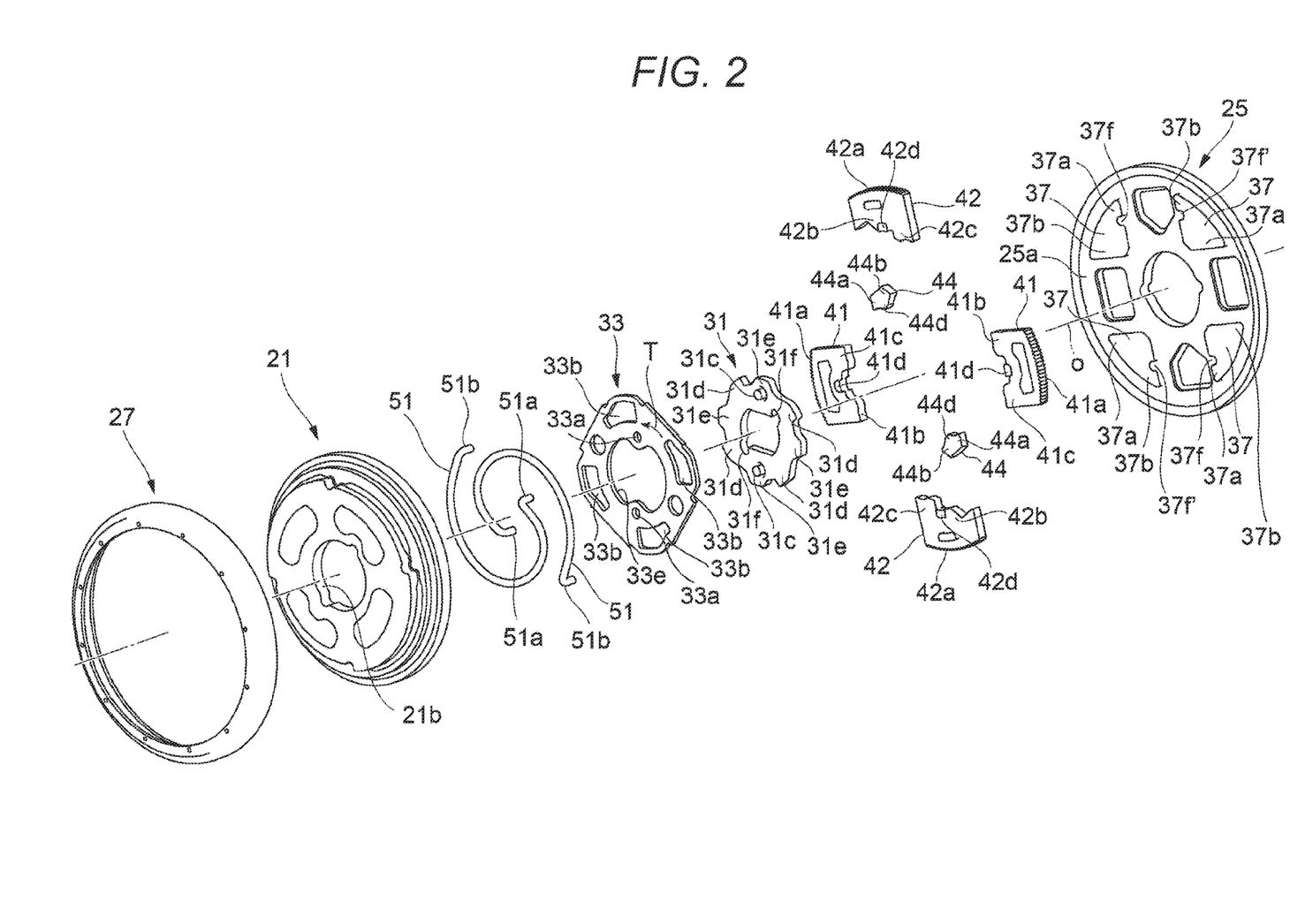
FIG. 2 is an exploded perspective view of the exploded perspective view of FIG. 1 viewed from an opposite direction.
Figure 3:
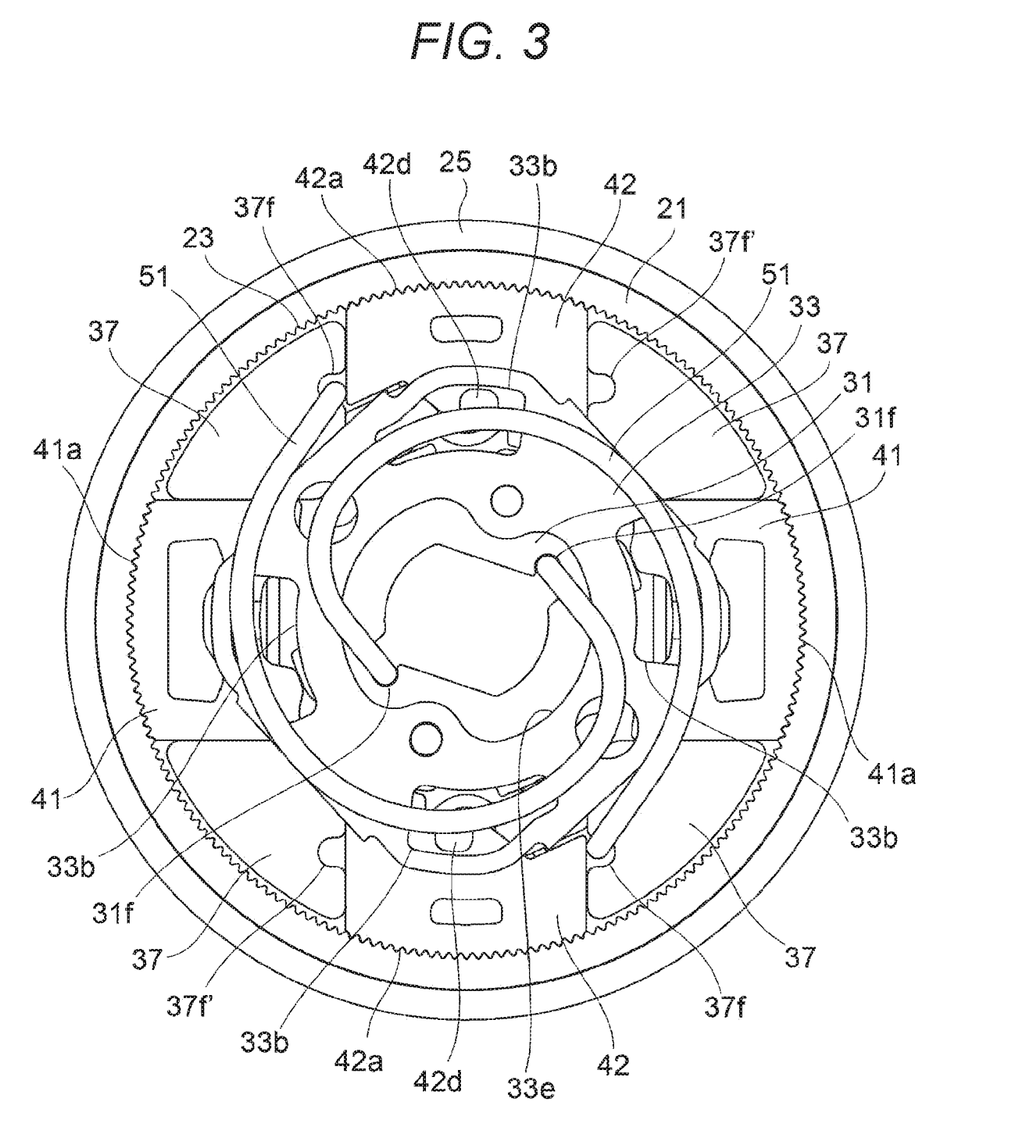
FIG. 3 is a cross-sectional view taken along a cutting line III-III of an assembled reclining apparatus (locked state) of FIG. 1.
Figure 4:
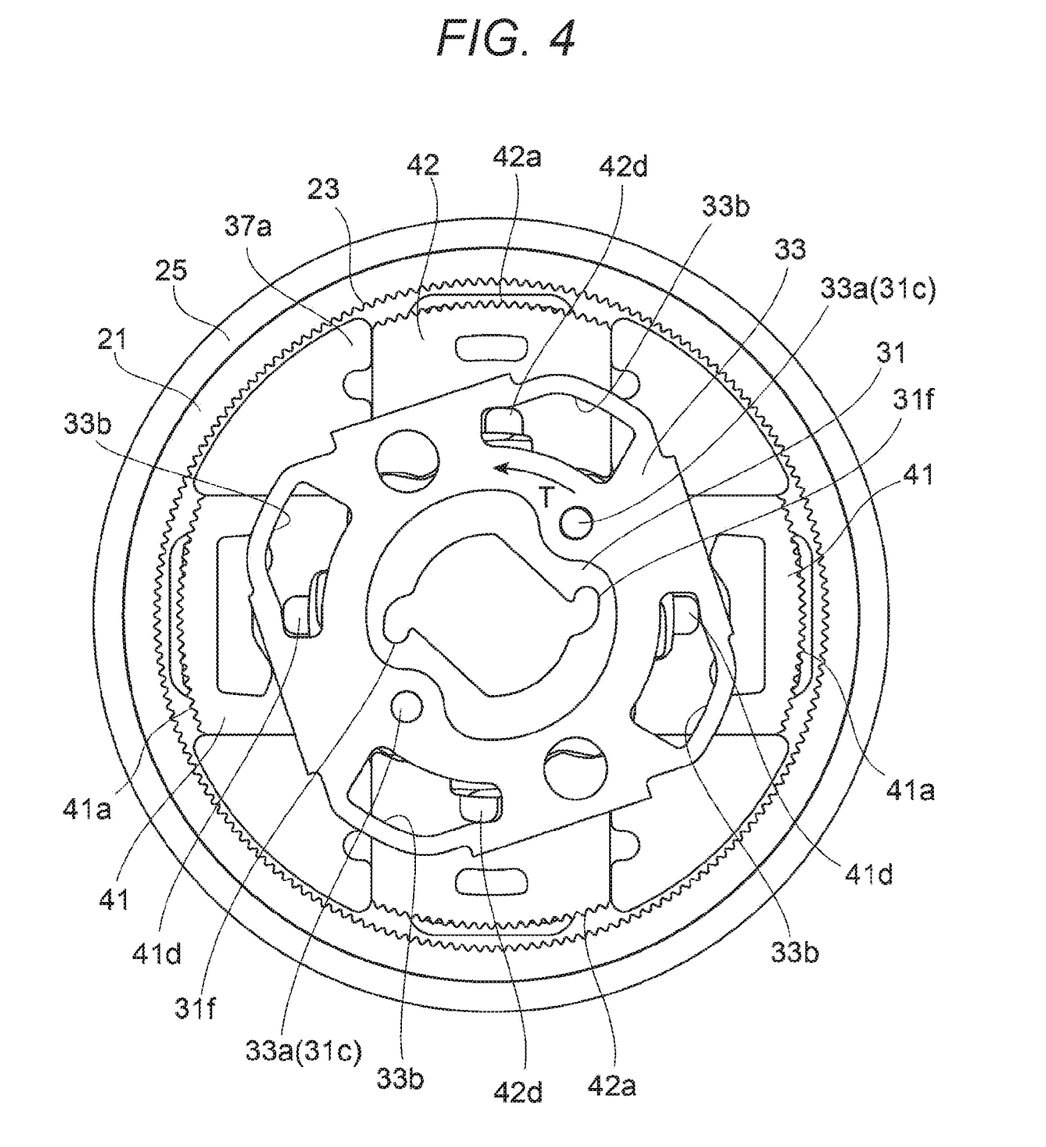
FIG. 4 is a cross-sectional view taken along a cutting line IV-IV of the assembled reclining apparatus (unlocked state) of FIG. 1.
Figure 5:
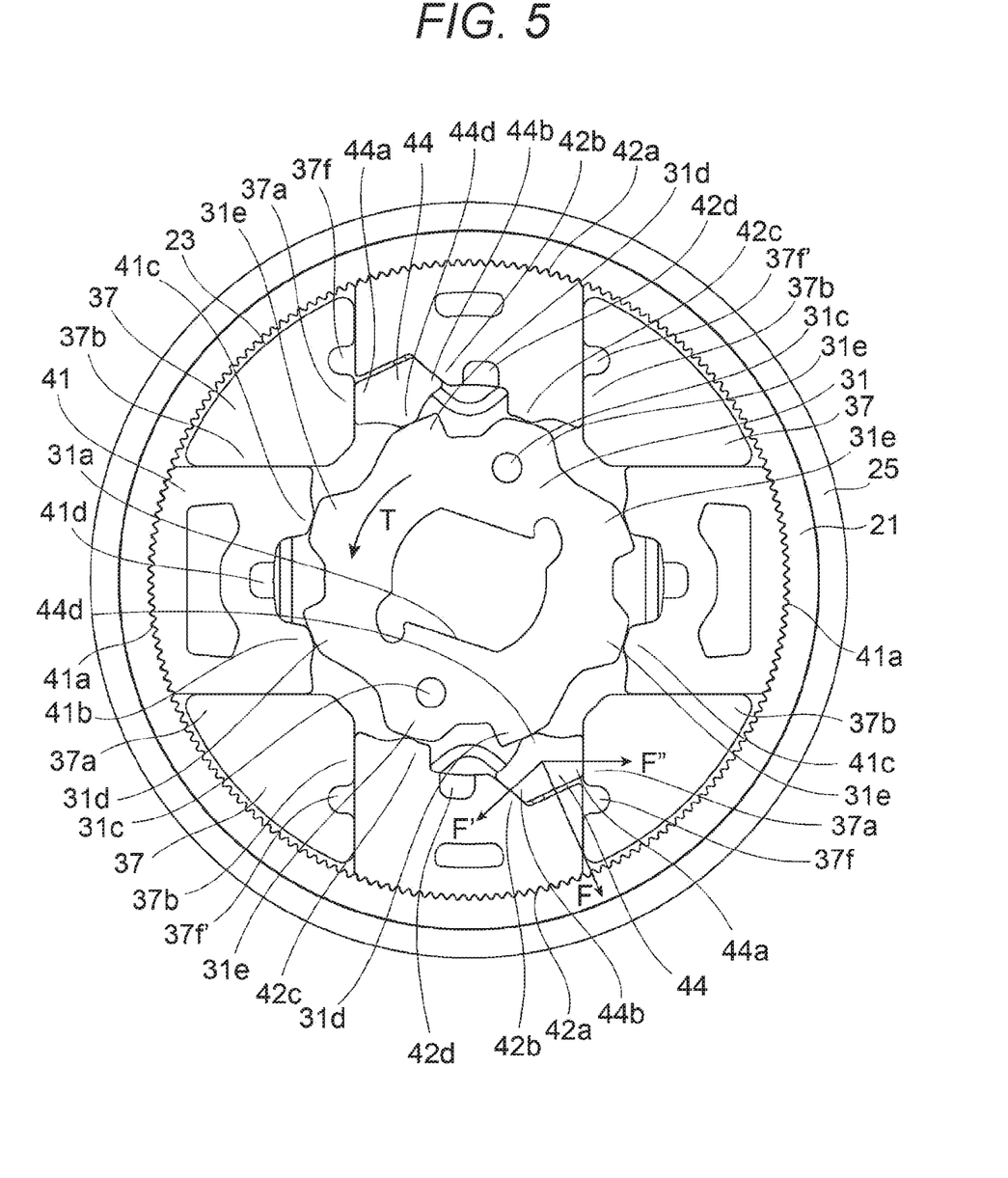
FIG. 5 is a cross-sectional view taken along a cutting line V-V of the assembled reclining apparatus (locked state) of FIG. 1.
Figure 6:
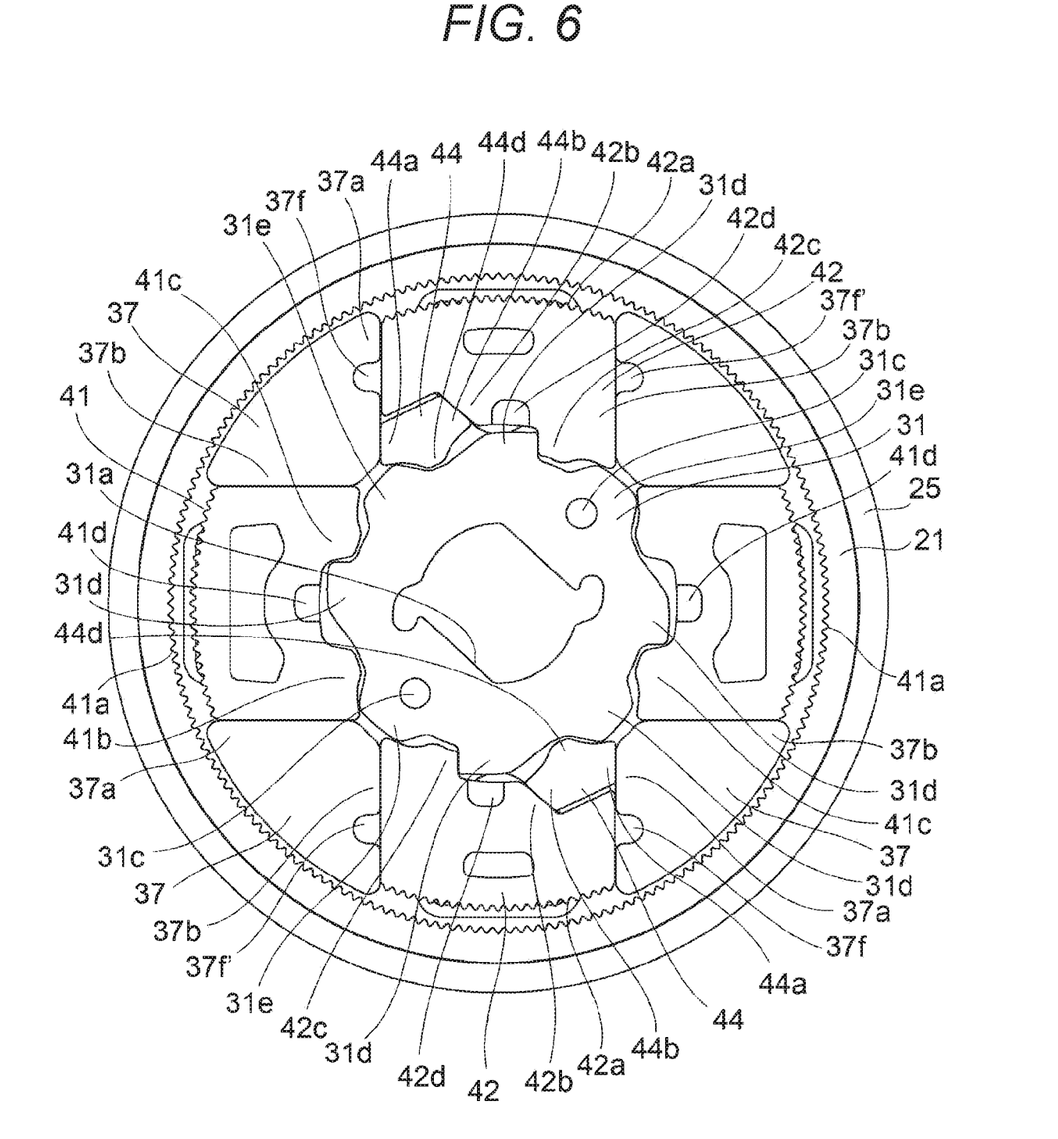
FIG. 6 is a view illustrating the unlocked state of the reclining apparatus of FIG. 5.
Figure 7:
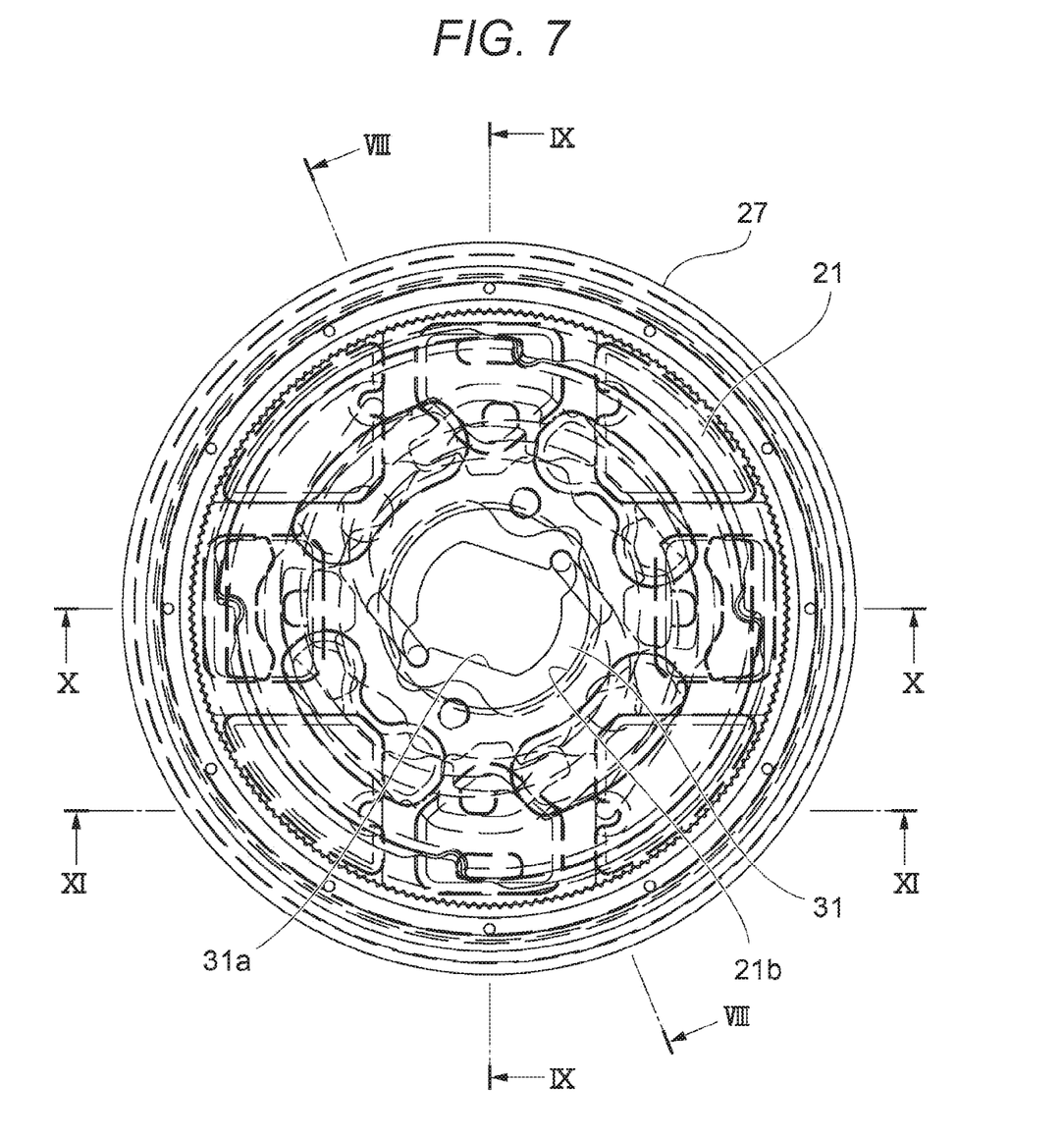
FIG. 7 is a front view of the assembled reclining apparatus of FIG. 1 viewed from a direction of an arrow VII.
Figure 8:
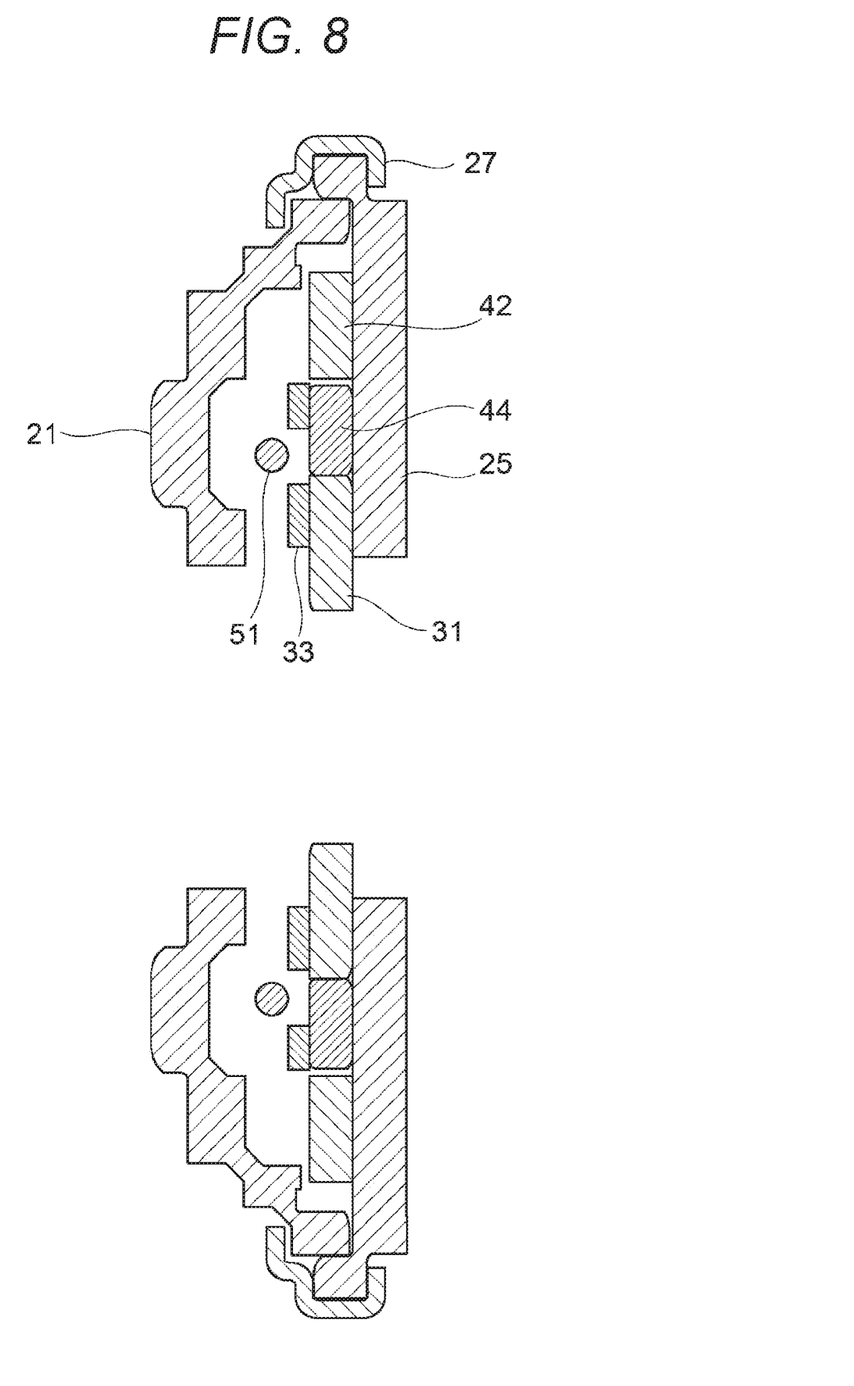
Figure 9:
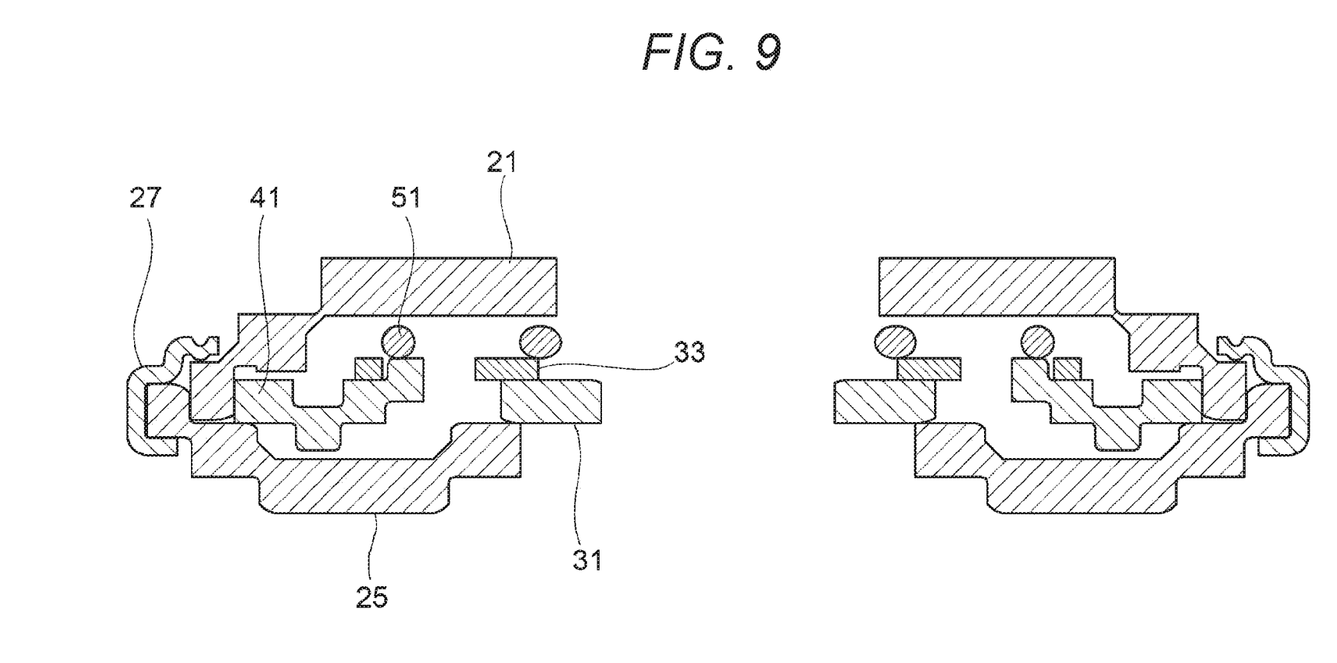
FIG. 9 is an end view of a cutting portion taken along a cutting line IX-IX of FIG. 7.
Figure 10:
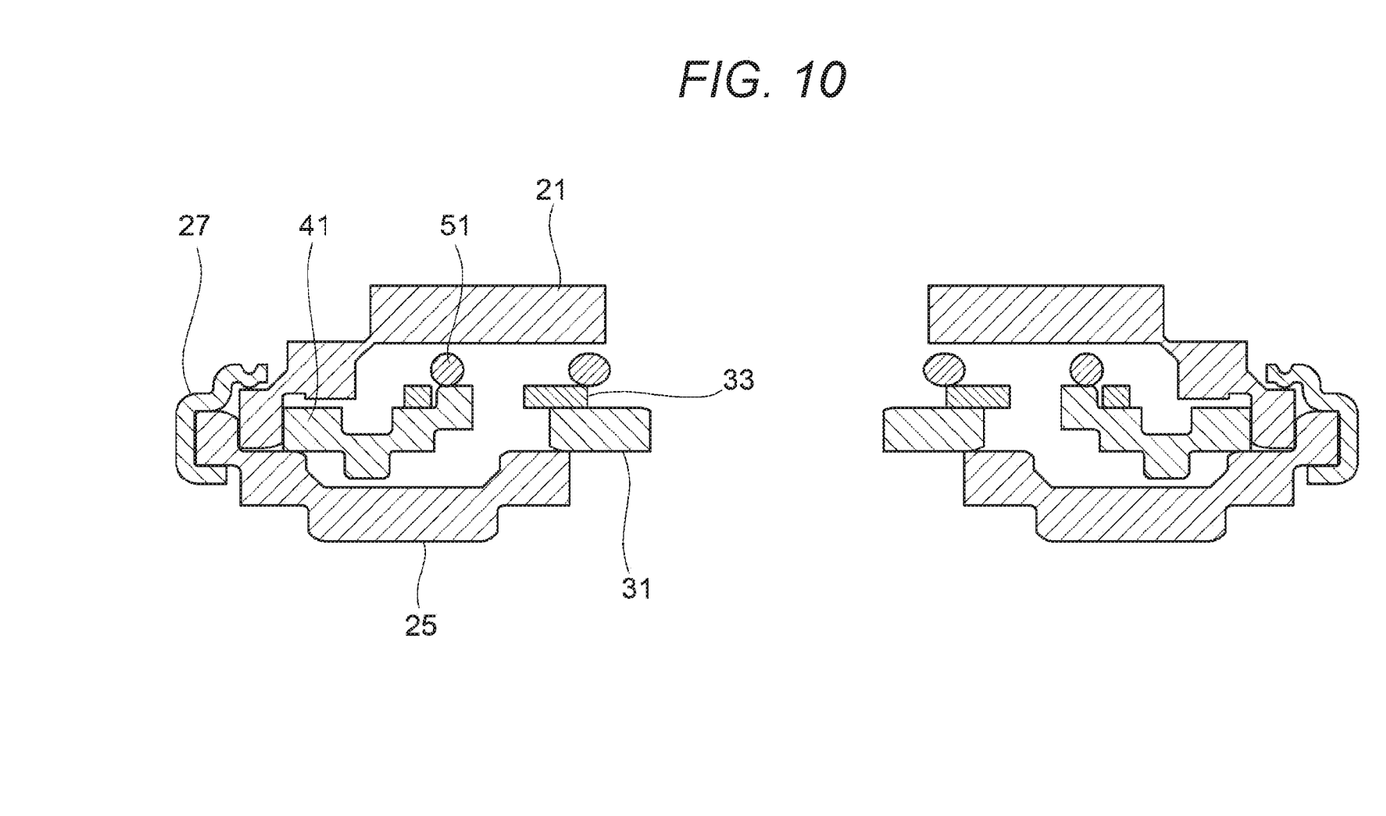
FIG. 10 is an end view of a cutting portion taken along a cutting line X-X of FIG. 7.
Figure 11:
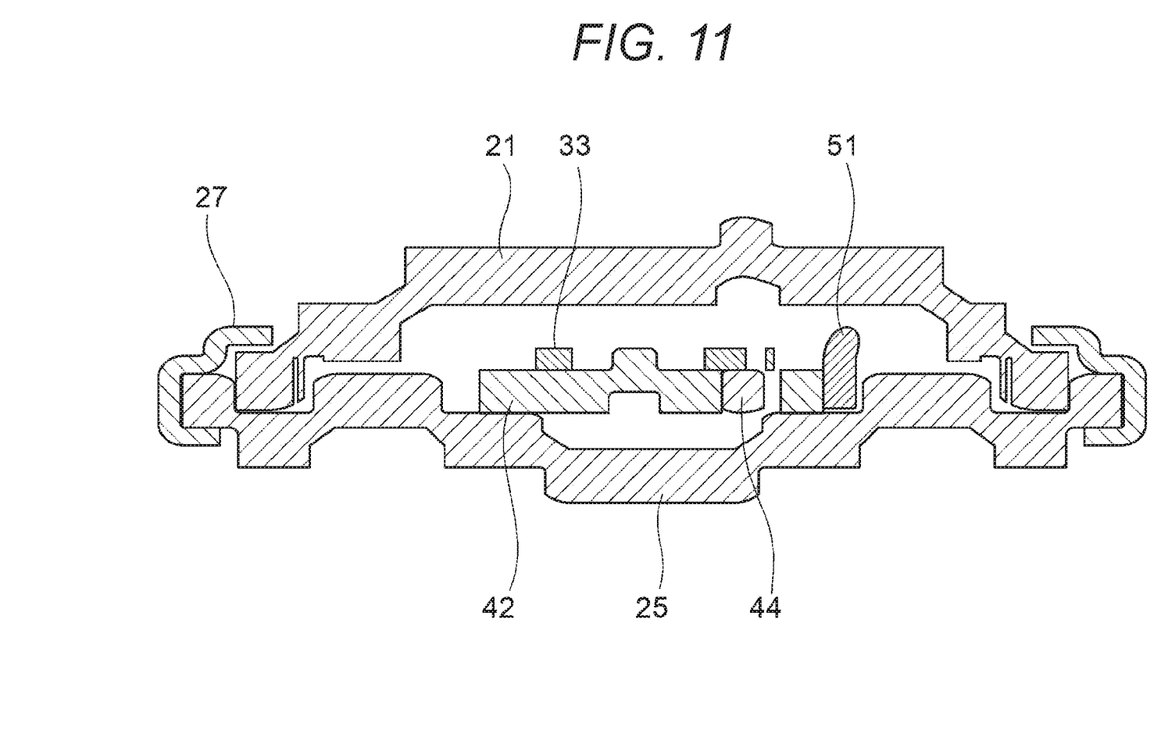
FIG. 11 is an end view of a cutting portion taken along a cutting line XI-XI of FIG. 7.

The reclining apparatus 4 is described with reference to FIGS. 1 to 11. FIG. 1 is an exploded perspective view of the reclining apparatus of the present embodiment. FIG. 2 is an exploded perspective view of the exploded perspective view of FIG. 1 viewed from an opposite direction. FIG. 3 is a cross-sectional view taken along a cutting line III-III of an assembled reclining apparatus (locked state) of FIG. 1. FIG. 4 is a cross-sectional view taken along a cutting line IV-IV of the assembled reclining apparatus (unlocked state) of FIG. 1. FIG. 5 is a cross-sectional view taken along a cutting line V-V of the assembled reclining apparatus (locked state) of FIG. 1. FIG. 6 is a view illustrating the reclining apparatus of FIG. 5 in the unlocked state. FIG. 7 is a front view of the assembled reclining apparatus of FIG. 1 viewed from a direction of an arrow VII. FIG. 8 is an end view of a cutting portion taken along a cutting line VIII-VIII in FIG. 7. FIG. 9 is an end view of a cutting portion taken along a cutting line IX-IX of FIG. 7. FIG. 10 is an end view of a cutting portion taken along a cutting line X-X of FIG. 7. FIG. 11 is an end view of a cutting portion taken along a cutting line XI-XI of FIG. 7.

A ratchet (first member) 21 provided on the seat back 3 side has a bottomed cylindrical shape obtained by half blanking a disk-shaped plate material by pressing. The ratchet 21 is formed with a circular recess 21a. Inner teeth 23 are formed on an entire region in a circumferential direction on an inner circumferential surface of the circular recess 21a. Further, a through-hole 21b is formed in a center of the circular recess 21a. A shaft (not shown) disposed along the rotation axis (axis O in FIGS. 1 and 2) of the reclining of the seat back 3 is loosely inserted into the hole 21b. Note that a cross-sectional shape of the shaft (not shown) of the present embodiment is not circular (the cross-sectional shape is oval in the present embodiment).

Similarly to the ratchet 21, a base plate (second member) 25 provided on the seat cushion 2 side is also formed by half blanking a disk-shaped plate material by pressing. The base plate 25 is formed with a circular recess 25a. A diameter of the circular recess 25a is set slightly larger than an outer diameter of the ratchet 21. Then, the ratchet 21 is fitted into the circular recess 25a. The base plate 25 and the ratchet 21 can rotate relative to each other. A through-hole 25b is formed in a center of the base plate 25. The shaft (not shown) is loosely inserted into the hole 25b.

An outer peripheral portion of the ratchet 21 and an outer peripheral portion of the base plate 25 are clamped by a ring-shaped outer peripheral ring 27. Then, the ratchet 21 and the base plate 25 are held relatively rotatable without being separated in a direction of the axis O of relative rotation.

A cam 31 is disposed in a space defined by the circular recess 21a of the ratchet 21 and the circular recess 25a of the base plate 25. A hole (an oval shape in the present embodiment) 31a into which the shaft (not shown) is fitted is formed in a center of the cam 31. Then, the shaft (not shown) and the cam 31 rotate integrally. Therefore, the shaft (not shown) is a transmission member. The transmission member transmits movement of the cam 31 of one of reclining apparatuses provided on both sides of the seat to the cam of the other reclining apparatus. The cam 31 is formed with two protrusions 31c projecting toward the ratchet 21. Four first protrusions 31d and four second protrusions 31e are alternately formed in the circumferential direction on the outer peripheral portion of the cam 31. The cam 31 is formed with two holes 31f in which two formed wire springs 51 described below are engaged.

A release plate 33 is disposed between the cam 31 and the circular recess 21a of the ratchet 21. The release plate 33 is formed with holes 33a in which the two protrusions 31c of the cam 31 are engaged. Engagement between the protrusions 31c and the holes 33a causes the cam 31 and the release plate 33 to rotate integrally. A hole 33e is formed in a center of the release plate 33.

Between the release plate 33 and the circular recess 25a of the base plate 25, four pawls, that is, two first pawls 41 and two second pawls 42 are alternately arranged in the circumferential direction about the axis O. In the present embodiment, the first pawl 41 and the second pawl 42 are arranged at a pitch of approximately 90° in the circumferential direction about the axis O. That is, the second pawls 42 are diagonally arranged.

Outer teeth 41a and outer teeth 42a capable of meshing with the inner teeth 23 are respectively formed on surfaces of the first pawl 41 and the second pawl 42 facing the inner teeth 23.

Further, a second cam 44 is disposed between the second pawl 42 and the cam 31. That is, two (a set of) second cams 44 are diagonally arranged.

A first contacted portion 41b and a second contacted portion 41c are formed on a surface of the first pawl 41 opposite to a surface on which the outer teeth 41a are provided. The first protrusion 31d of the cam 31 can contact the first contacted portion 41b. The second protrusion 31e of the cam 31 can contact the second contacted portion 41c.

A first contacted portion 42b and a second contacted portion 42c are formed on a surface of the second pawl 42 opposite to a surface on which the outer teeth 42a of the second pawl 42 are provided. The second cam 44 can contact the first contacted portion 42b. The second protrusion 31e of the cam 31 can contact the second contacted portion 42c.

The second cam 44 is formed with a first contacted portion 44d, a guide contact portion 44a, and a first contact portion 44b. The first protrusion 31d of the cam 31 can contact the first contacted portion 44d. The guide contact portion 44a can contact a pawl guide protrusion (pawl guide) 37 described below. The first contact portion 44b can contact the first contacted portion 42b of the second pawl 42.

In the circular recess 25a of the base plate 25, four pawl guide protrusions 37 are formed at a pitch of 90° in the circumferential direction about the axis O of relative rotation.

With the two adjacent pawl guide protrusions 37, the first pawl 41 and the second pawl 42 can move only in a radial direction about the axis O of relative rotation. That is, the pawl guide protrusion 37 guides the first pawl 41 and the second pawl 42 between the locked position and the unlocked position. In the locked position, the outer teeth 41a and the outer teeth 42a mesh with the inner teeth 23 of the ratchet 21. In the unlocked position, the outer teeth 41a and the outer teeth 42a are separated from the inner teeth 23 of the ratchet 21.

Protrusions 41d and 42d projecting toward the release plate 33 are formed on the surfaces of the first pawl 41 and the second pawl 42 facing the release plate 33. Cam holes 33b are formed in the release plate 33. The protrusion 41d of the first pawl 41 and the protrusion 42d of the second pawl 42 are engaged with the cam holes 33b. The cam holes 33b are formed with inclined surfaces which the protrusion 41d of the first pawl 41 and the protrusion 42d of the second pawl 42 contact. The shape of the inclined surface is formed such that when the release plate 33 in the locked state rotates in a direction opposite to an arrow T in FIGS. 1, 2 and 4, along the pawl guide protrusions 37, the first pawl 41 and the second pawl 42 move in a direction (an unlocked position direction) in which the outer teeth 41a of the first pawl 41 and the outer teeth 42a of the second pawl 42 move away from the inner teeth 23 of the ratchet 21.

Between the release plate 33 and the circular recess 21a of the ratchet 21, the two formed wire springs 51 curved in a substantially C shape are arranged.

Two adjacent pawl guide protrusions (pawl guides) 37 are provided to sandwich the first pawl 41 and the second pawl 42 from their side portions. A first pawl guide 37a and a second pawl guide 37b are formed on each of the pawl guide protrusions 37. The first pawl guide 37a faces one side portion of the first pawl 41 or one side portion of the second pawl 42. The second pawl guide 37b faces the other side portion of the first pawl 41 or the other side portion of the second pawl 42.

A recess 37f is formed in the first pawl guide 37a facing the one side portion of the second pawl 42. The recess 37f and the one side portion of the second pawl 42 define a space. In the present embodiment, the second pawl guide 37b facing the other side portion of the second pawl 42 is also formed with a recess 37f. The recess 37f and the other side portion of the second pawl 42 define a space.

A first end 51a bent toward the base plate 25 is formed on one end of each of the two formed wire springs 51. A second end 51b bent toward the base plate 25 is formed on the other end of each of the two formed wire springs 51.

Then, in a state where the formed wire spring 51 is elastically deformed, the first end 51a passes through the hole 33e of the release plate 33 and engages with the hole 31f formed in the cam 31. The second end 51b is inserted into the recess 37f of the first pawl guide 37a.

By an elastic repulsive force of the formed wire spring 51, the first end 51a of the formed wire spring 51 presses an inner wall surface of the hole 31f of the cam 31 with a force F. Then, the cam 31 is urged in a direction (one direction) in which the first protrusion 31d and the second protrusion 31e respectively face the first contacted portion 41b and the second contacted portion 41c of the first pawl 41, and the second contacted portion 42c of the second pawl 42 and the first contacted portion 44d of the second cam 44.

The second end 51b inserted into the recess 37f of the first pawl guide 37a presses the one side portion of the second pawl 42. The second end 51b presses the second pawl 42 toward the second pawl guide (one pawl guide) 37b facing the other side portion of the second pawl 42. In the present embodiment, the formed wire spring 51 always presses the second pawl 42 to the second pawl guide 37b facing the other side portion of the second pawl 42 even during movements from the locked state to the unlocked state and from the unlocked state to the locked state.

In the present embodiment, when the second end 51b of the formed wire spring 51 is fitted (inserted) into the recess 37f of the pawl guide protrusion 37, the second end 51b of the formed wire spring 51 presses and urges the one side portion of the second pawl 42. A space (gap) exists on a surface of the formed wire spring 51 opposite to a pressing surface of the second end 51b. When a force equal to or greater than an urging force acts on the second end 51b of the formed wire spring 51 in a direction different from the urging force, the second end 51b can move in a direction of breaking away (being separated) from the one side portion of the second pawl 42.

Then, when the first pawl 41 and the second pawl 42 are in the locked position, as illustrated in FIG. 5, the second cam 44 receiving the force F from the cam 31 presses the second pawl 42 toward the locked position with a component force F' of the force F. At the same time, the second cam 44 presses the second pawl 42 against the second pawl guide 37b of the pawl guide protrusion 37. The second cam presses the first pawl guide 37a of the pawl guide protrusion 37 with a component force F" of the force F.

Here, an operation of the reclining apparatus having the above configuration will be described.

Normally, as illustrated in FIGS. 3 and 5, by the elastic repulsive force of the formed wire spring 51, the first pawl 41 and the second pawl 42 provided on the base plate 25 is in the locked position through the cam 31. At this time, the outer teeth 41a and the outer teeth 42a mesh with the inner teeth 23 of the ratchet 21. Relative rotation between the ratchet (first member) 21 and the base plate (second member) 25 is prohibited. In this way, the seat back is in a state (the locked state) where it cannot rotate with respect to the seat cushion.

The cam 31 rotates in the other direction (the direction opposite to the arrow T) by the operation against the urging force of the formed wire spring 51. Then, by engagement between the protrusion 31c of the cam 31 and the hole 33a of the release plate 33, the release plate 33 also rotates together. At this time, pressing of the first protrusion 31d of the cam 31 against the first contacted portion 41b of the first pawl 41 and the first contacted portion 44d of the second cam 44 is released.

Further, when the release plate 33 rotates, the inclined surface of the cam hole 33b of the release plate 33 with which the protrusion 41d of the pawl 41 engages causes the first pawl 41 and the second pawl 42 (and the second cam 44) to move to the unlocked position. At this time, the outer teeth 41a and the outer teeth 42a are released from meshing with the inner teeth 23 of the ratchet 21. As illustrated in FIGS. 4 and 6, the ratchet (first member) 21 and the base plate (second member) 25 can rotate relative to each other. In this way, the seat back becomes rotatable (unlocked state) with respect to the seat cushion. At this time, the second pawl 42 is pressed against the second pawl guide 37b by the second end 51b of the formed wire spring 51.

When the operating force on the cam 31 is released, the cam 31 and the release plate 33 are returned to their original positions by the urging force of the formed wire spring 51. At the same time, the first protrusion 31d of the cam 31 presses the first contacted portion 41b of the first pawl 41 and the first contacted portion 44d of the second cam 44. Then, the outer teeth 41a of the first pawl 41 and the outer teeth 42a of the second pawl 42 are meshed with the inner teeth 23 of the ratchet 21. Further, the relative rotation between the ratchet (first member) 21 and the base plate (second member) 25 is prohibited. In this way, the locked state is reproduced. Also during this period, the second pawl 42 remains pressed against the second pawl guide 37b by the second end 51b of the formed wire spring 51.

According to the present embodiment, the following effects can be obtained. (1) The formed wire spring 51 always presses the second pawl 42 to the second pawl guide 37b facing the other side portion of the second pawl 42 even during the movements from the locked state to the unlocked state and from the unlocked state to the locked state. Therefore, orientation of the second pawl 42 is stable even in a state where the second pawl 42 is in the unlocked position. Further, the second pawl 42 can move to the locked position in the state as it is. Therefore, meshing between the outer teeth 42a of the second pawl 42 and the inner teeth 23 of the ratchet 21 is stable.

Further, by having the second cam 44, when the second pawl 42 moves to the locked position, backlash at the time of meshing between the outer teeth 42a of the second pawl 42 and the inner teeth 23 of the ratchet 21 does not occur. Specifically, in the present embodiment, the second pawl 42 is pressed against the second pawl guide 37b of the pawl guide protrusion 37 by the second cam 44. At the same time, the second pawl 42 is pressed against the second pawl guide 37b of the pawl guide protrusion 37 also by the second end 51b of the formed wire spring 51. Thus, loss of force caused by a difference between a pressing direction by the formed wire spring 51 and a pressing direction of the second cam 44 is small. Therefore, the backlash at the time of meshing between the outer teeth 42a of the second pawl 42 and the inner teeth 23 of the ratchet 21 is stably prevented. (2) There is a pair of second cams 44 arranged diagonally. Therefore, it is possible to more effectively prevent backlash of the base plate (second member) 25 in a relative rotation direction when locked. (3) One end of the formed wire spring 51 presses the second pawl 42 toward the second pawl guide 37b. The other end of the formed wire spring 51 is attached to the cam 31 to urge the cam 31. This reduces the number of parts. (4) The second end 51b of the formed wire spring 51 directly contact the one side portion of the second pawl 42. Therefore, the number of parts is reduced. In addition, there is no loss of the urging force by passing through another member. (5) By fitting (inserting) the second end 51b of the formed wire spring 51 into the recess 37f of the first pawl guide 37a, the second end 51b of the formed wire spring 51 presses and urges the one side portion of the second pawl 42. The space (gap) exists on a surface of the formed wire spring 51 opposite to a pressing surface of the second end 51b. Then, when the force equal to or greater than the urging force acts on the second end 51b of the formed wire spring 51 in the direction different from the urging force, the second end 51b can move in the direction of breaking away from the one side portion of the second pawl 42. Therefore, even if a load is applied from the second pawl 42 toward the one end of the formed wire spring 51, the one end of the formed wire spring 51 is not affected.

The present invention is not limited to the above embodiment.

For example, the four pawls have been described in the above embodiment. However, three pawls can be used. In this case, two of the three pawls are preferably the second pawls. At this time, the second pawl is provided diagonally to the second cam.

Further, five or more pawls can be used. In this case, there are at least two second cams. A pair of second cams out of the second cams is preferably arranged diagonally to each other.

Furthermore, in the above embodiment, the spring (first spring) urging the cam 31 and the spring (second spring) pressing the second pawl 42 against one pawl guide protrusion (pawl guide) 37 are the same formed wire spring 51. However, there may be provided springs different from each other.

In the above embodiment, the first end 51a of the formed wire spring 51 engages with the cam 31 to urge the cam 31. However, the first end 51a may be engaged with the release plate 33 that rotates integrally with the cam 31.

This application claims priority from Japanese Patent Application No. 2018-32878 filed with the Japan Patent Office on Feb. 27, 2018, the entire content of which is hereby incorporated by reference.

The foregoing descriptions of specific embodiments of the present invention have been presented for purposes of illustration. They are not intended to be exhaustive or to limit the invention to the exact form described. It will be apparent to those skilled in the art that numerous variations and modifications can be made in light of the above descriptions.

LIST OF REFERENCE SIGNS

21: ratchet (first member), 25: base plate (second member), 31: cam, 37: pawl guide, 41: first pawl, 42: second pawl, 51: formed wire spring.

The invention claimed is:

1. A reclining apparatus comprising:
a first member having inner teeth formed in a circumferential direction on its inner cylindrical surface;
a plurality of pawls having outer teeth meshable with the inner teeth;
a second member that is laminated on an outer cylindrical surface of the first member and is provided rotatable relative to the first member in the circumferential direction, and further has a plurality of pawl guides configured to guide the pawls between a locked position in which the outer teeth mesh with the inner teeth and an unlocked position in which the outer teeth are separated from the inner teeth;
a cam that is rotatably provided between the first member and the second member and causes the pawls to move toward the locked position; and
one or more second cams that are provided between the cam and one or more of the pawls, and are pressed by the cam to press the one or more of the pawls, wherein
each of the pawls is guided between two of the pawl guides,
when the pawls are in the locked position,
relative rotation between the first member and the second member is prohibited, and
the one or more second cams directly contacts and presses the one or more of the pawls in a direction toward one or more of the pawl guides to contact the one or more of the pawl guides, and
one or more springs directly contact and press the one or more of the pawls in the direction toward the one or more of the pawl guides to contact the one or more of the pawl guides,
wherein a recess into which one end of the one or more springs is inserted is formed in one or more other of the pawl guides.

2. The reclining apparatus according to claim 1, wherein
at least two pawls out of the pawls are diagonally arranged,
wherein the one or more second cams are comprised of at least two second cams, and
the at least two second cams are respectively arranged between the cam and the diagonally arranged pawls.

3. The reclining apparatus according to claim 1, wherein
the one end of the one or more springs presses the one or more of the pawls toward the one or more of the pawl guides, and
the other end of the spring is attached to the cam to urge the cam toward the locked position.

4. The reclining apparatus according to claim 3, wherein the one end of the one or more springs is in direct contact with the one or more of the pawls.

5. The reclining apparatus according to claim 3, wherein in the locked position, there is a gap between the one end of the one or more springs and the recess in a direction opposite to a direction in which the one or more springs presses the pawl toward the one or more of the pawl guides.

* * * * *